United States Patent
Kuo

(10) Patent No.: US 10,221,995 B1
(45) Date of Patent: Mar. 5, 2019

(54) QUICK-RELEASE STRUCTURE FOR A GREASE GUN

(71) Applicant: Shuoxing Metal Products (Kunshan) CO., LTD., Jiangsu (CN)

(72) Inventor: Heng-Chia Kuo, Jiangsu (CN)

(73) Assignee: Shuoxing Metal Products Co., Ltd., Kunshan (CN)

( * ) Notice: Subject to any disclaimer, the term of this patent is extended or adjusted under 35 U.S.C. 154(b) by 0 days.

(21) Appl. No.: 15/842,464

(22) Filed: Dec. 14, 2017

(30) Foreign Application Priority Data

Aug. 9, 2017  (CN) ...................... 2017 2 0990048 U

(51) Int. Cl.
*F16N 3/12* (2006.01)
*F16L 37/086* (2006.01)
*B05C 17/005* (2006.01)

(52) U.S. Cl.
CPC .............. *F16N 3/12* (2013.01); *F16L 37/086* (2013.01); *B05C 17/00596* (2013.01)

(58) Field of Classification Search
CPC .......................... F16N 3/12; B05C 17/00596
See application file for complete search history.

(56) References Cited

U.S. PATENT DOCUMENTS

| 9,297,498 | B1* | 3/2016 | Kuntzelman | F16N 3/12 |
| 2014/0062080 | A1* | 3/2014 | Battisti | F16L 37/08 |
| | | | | 285/86 |
| 2015/0233524 | A1* | 8/2015 | Kuo | F16N 19/00 |
| | | | | 222/386 |
| 2015/0247597 | A1* | 9/2015 | Okiyama | A61M 39/045 |
| | | | | 285/317 |
| 2017/0241581 | A1* | 8/2017 | Decker | A61M 39/1011 |
| 2017/0370510 | A1* | 12/2017 | Hsu | B60C 29/00 |
| 2018/0023741 | A1* | 1/2018 | Lu | F16L 37/0841 |
| | | | | 285/305 |

* cited by examiner

*Primary Examiner* — Donnell Long
(74) *Attorney, Agent, or Firm* — Wang Law Firm, Inc.

(57) ABSTRACT

A quick-release structure for a grease gun includes: a cylinder including a peripheral wall and a fixing groove formed in an insertion section of the peripheral wall; the grease gun including an outer surface, an insertion hole, a slot formed in the outer surface and in communication with the insertion hole, the cylinder is inserted in the insertion hole and the fixing groove is aligned to the slot; a locking member inserted through the slot and into the fixing groove; a base fixed to the outer surface; an elastic member disposed between the base and the locking member; a press member including a press section and a drive section, the drive section is drivingly connected to the driven portion and to be pressed by a user; and a restricting member mounted on the base, and the press section of the press member leans against the restricting member.

6 Claims, 7 Drawing Sheets

QUICK-RELEASE STRUCTURE FOR A GREASE GUN

BACKGROUND OF THE INVENTION

Field of the Invention

The present invention relates to a grease gun, and more particularly to a quick-release structure for a grease gun.

Related Prior Art

A grease gun 10 must be used in combination with a cylinder 20, as shown in FIG. 1, and has an insertion hole provided with an inner thread 11 for meshing with an outer thread 21 of the cylinder 20, so as to fix the cylinder 20 to the grease gun 10. When the grease in the cylinder 20 is used up, the user has to rotate the cylinder 20 to release it from the grease gun 10.

However, the cylinder 20 is screwed to the grease gun 10, it will take time for the user to unscrew the cylinder 20 from the grease gun 10, which results in inefficient replacement of the cylinder 20.

In view of this, it is necessary to provide a quick release structure for the grease gun so that the user can quickly remove the cylinder 20 from the grease gun 10.

The present invention has arisen to mitigate and/or obviate the afore-described disadvantages.

SUMMARY

The technical problem to be solved by the utility model is to provide a quick-release structure for a grease gun, which solves the problem that it takes a lot of time to remove the cylinder from a conventional grease gun, and thus improving the efficiency of cylinder replacement.

To solve the above problem, a quick-release structure for a grease gun provided by the invention, comprises:

a cylinder including a peripheral wall, an insertion section on the peripheral wall, and a fixing groove formed in the insertion section;

the grease gun including an outer surface, a bottom surface and an insertion hole formed in the bottom surface, wherein a slot is formed in the outer surface and in communication with the insertion hole, the insertion section is inserted in the insertion hole, the fixing groove is aligned to the slot;

a locking member including a first end surface and an opposite second end surface, and being inserted in the slot until the first end surface is engaged in the fixing groove, the second end surface including a driven portion and a positioning portion;

a base fixed to the outer surface, and including a rib and a block, the block includes an abutting surface facing toward the second end surface, and an opposite front surface, the abutting surface is located a distance away from the second end surface;

an elastic member disposed between the positioning portion of the second end surface and the abutting surface;

a press member including a press section and a drive section connected to the press section, the drive section is drivingly connected to the driven portion and to be pressed by a user; and a restricting member including a fixing section and a restricting section connected to the fixing section, the fixing section is mounted on the front surface, so that the press member is located between the restricting member and the locking member, and the press section of the press member leans against the restricting section.

Preferably, the peripheral wall has a cylindrical shape, the fixing groove is an annular groove surrounding the peripheral wall, the outer surface is connected to the bottom surface, and the slot is an elongated slot extending in an extending direction of the fixing groove.

Preferably, the first end surface of the locking member is arc-shaped so as to fit in the fixing groove.

Preferably, there are two said positioning portions and two said blocks, the two blocks are connected to two ends of the rib, the rib is located between the two blocks, there are two said elastic members, one of the two elastic members is disposed between one of the two blocks and one of the two positioning portions, and another of the two elastic members is disposed between another of the two blocks and another of the two positioning portions.

Preferably, there are two said blocks, the two blocks are connected to two ends of the rib, the rib is located between the two blocks, the restricting member is an elongated member, and there are two said fixing sections, so that the restricting section is located between the two fixing sections, and the two fixing sections are fixed on the two blocks, respectively.

Preferably, two screws are used to fix the two fixing sections to the two blocks, and fix the base to the slot of the grease gun.

By arrangements, the quick-release structure for a grease gun in accordance with the invention allows users to quickly disassemble and assemble the cylinder and the grease gun, thereby improving the operation efficiency and making the operation smoother.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
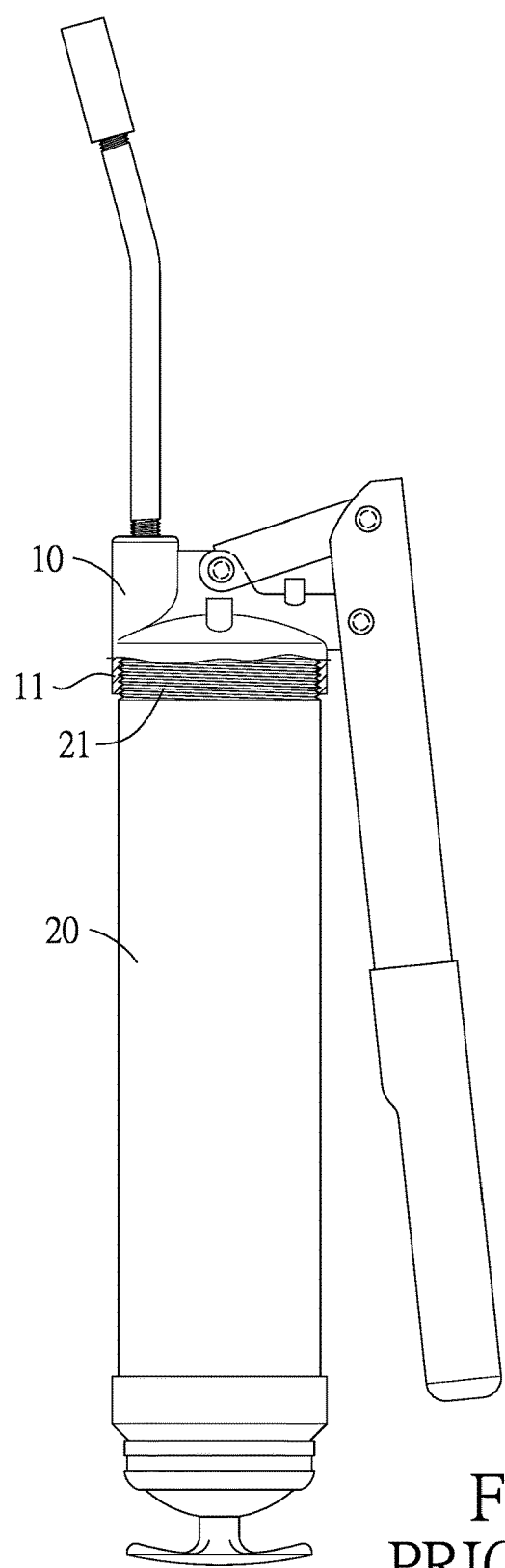
FIG. 1 is a cross sectional view of a conventional grease gun with a cylinder.
Figure 2:
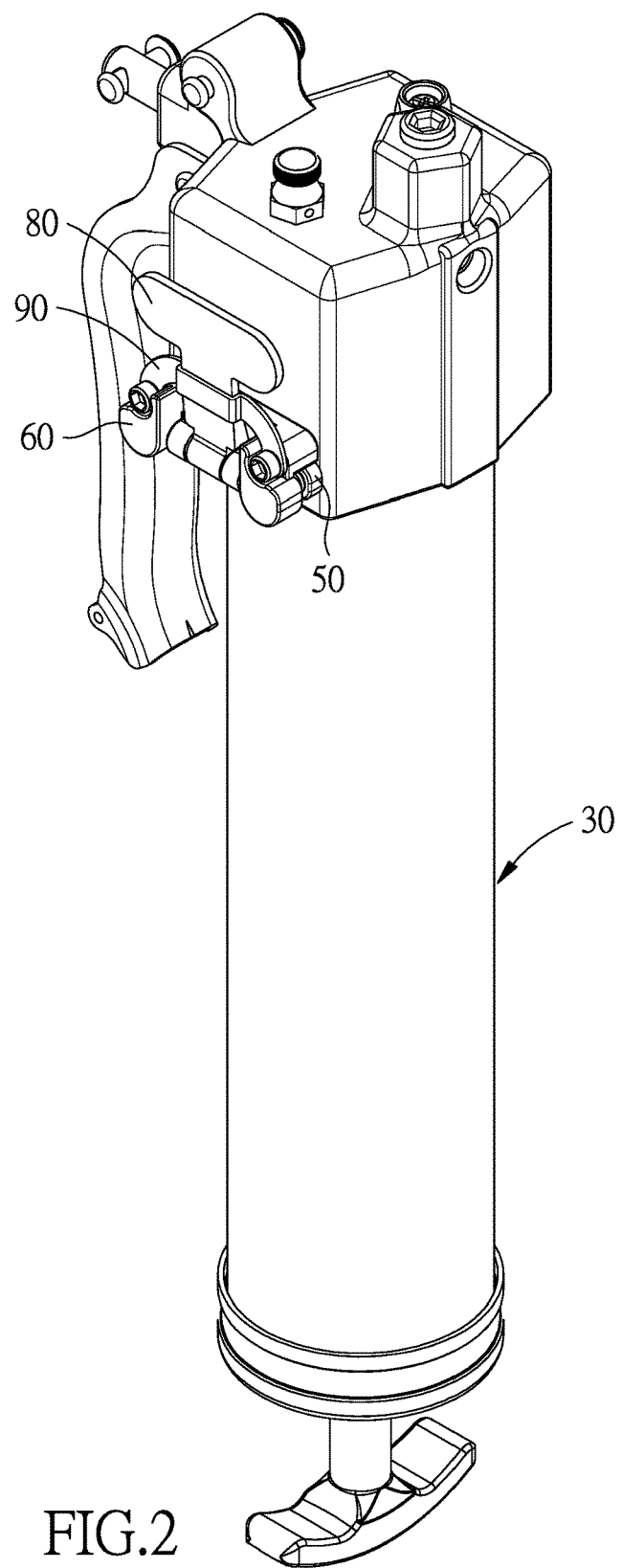
FIG. 2 is a perspective view of a grease gun with a quick-release structure in accordance with a preferred embodiment of the invention.
Figure 3:
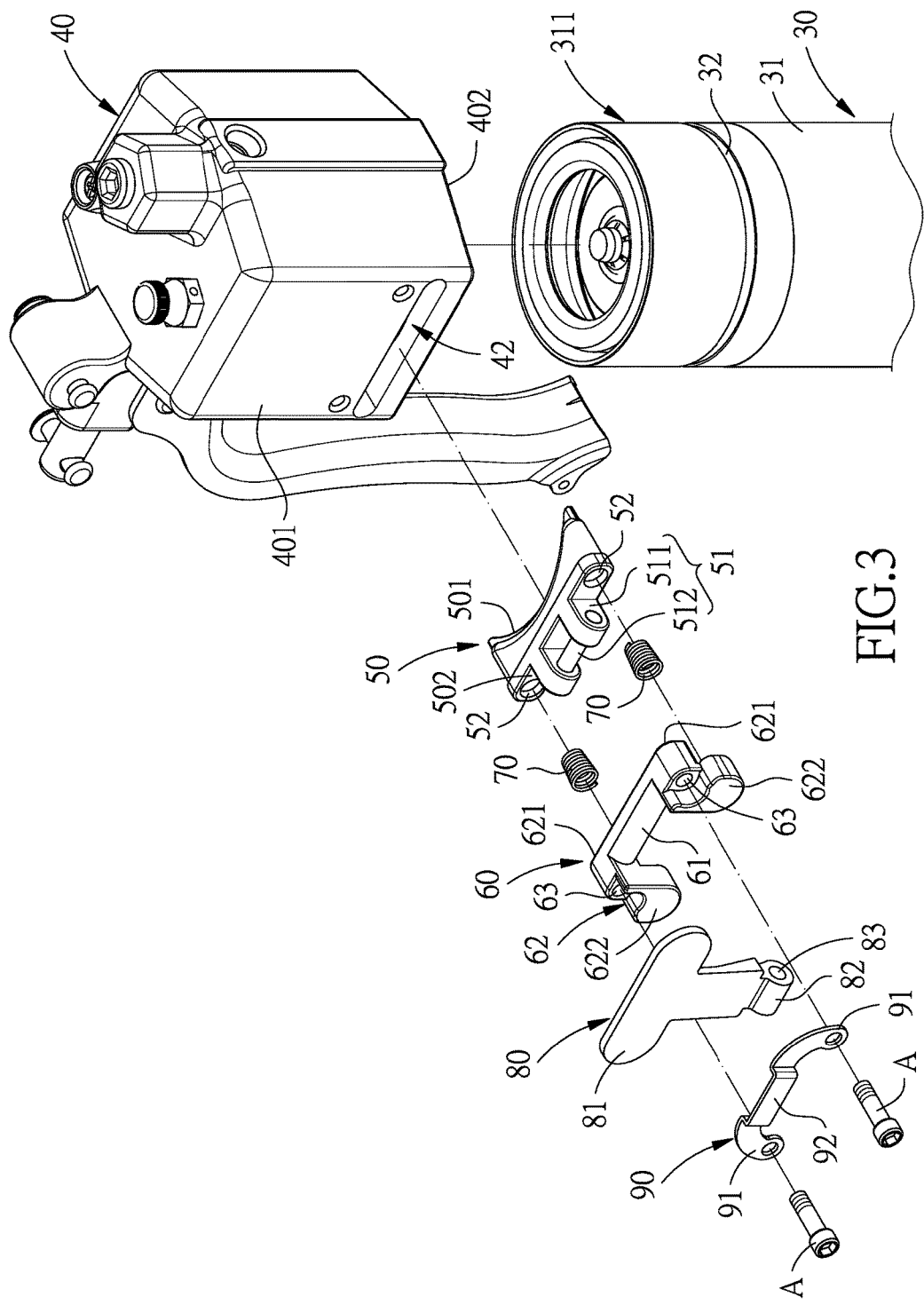
FIG. 3 is an exploded view of the quick-release structure for a grease gun in accordance with the preferred embodiment of the invention.

The present invention will be clearer from the following description when viewed together with the accompanying drawings, which show, for purpose of illustrations only, the preferred embodiment in accordance with the present invention.

Referring to FIGS. 2-7, a quick-release structure for a grease gun 40 in accordance with the preferred embodiment of the invention comprises: a cylinder 30, the grease gun 40, a locking member 50, a base 60, an elastic member 70, a press member 80 and a restricting member 90.

The cylinder 30 includes a peripheral wall 31, an insertion section 311 on the peripheral wall 31, and a fixing groove 32 formed in the insertion section 311.

In this embodiment, the peripheral wall 31 has a cylindrical shape, and the fixing groove 32 is an annular groove surrounding the peripheral wall 31.

The grease gun 40 includes an outer surface 401, a bottom surface 402 and an insertion hole 41 formed in the bottom surface 402. The outer surface 401 is connected to the bottom surface 402. A slot 42 is formed in the outer surface 401 and in communication with the insertion hole 41. The insertion section 311 of the cylinder 30 is inserted in the insertion hole 41, and the fixing groove 32 of the cylinder 30 is aligned to the slot 42.

In this embodiment, the outer surface 401 is connected to the bottom surface 402, and the slot 42 is an elongated slot extending in an extending direction of the fixing groove 32.

The locking member 50 includes a first end surface 501 and an opposite second end surface 502, and is inserted in the slot 42 until the first end surface 501 is engaged in the fixing groove 32. The second end surface 502 includes a driven portion 51 and a positioning portion 52.

In this embodiment, the first end surface 501 of the locking member 50 is roughly arc-shaped so that it can tightly and closely fit in the fixing groove 32.

The positioning portion 52 is a circular recess formed in the second end surface 502, and there are two positioning portions 52 in this embodiment.

The driven portion 51 is located between the two positioning portions 52, and includes two positioning protrusions 511 protruding from the second end surface 502 and a pivot 512 connected between the two positioning protrusions 511.

The base 60 is fixed to the outer surface 401, and includes a rib 61 and a block 62. The block 62 includes an abutting surface 621 facing toward the second end surface 502, and an opposite front surface 622. The abutting surface 621 is located a distance away from the second end surface 502. The block 62 further includes a locking hole 63.

In this embodiment, there are two blocks 62 connected to two ends of the rib 61, and the rib 61 is located between the two blocks 62.

The elastic member 70 is disposed between the positioning portion 52 of the second end surface 502 and the abutting surface 621.

In this embodiment, there are two elastic members 70, one is disposed between one of the blocks 62 and one of the positioning portions 52, and the other is disposed between another of the blocks 62 and another of the positioning portions 52.

The press member 80 is abutted against the rib 61, and includes a press section 81 and a drive section 82 connected to the press portion 81. The drive section 82 is drivingly connected to the driven portion 51 and to be pressed by a user.

In this embodiment, the drive section 82 includes a pivot hole 83 extending along the pivot 512, and the pivot 512 is pivotally inserted in the pivot hole 83.

The restricting member 90 includes a fixing section 91 and a restricting section 92 connected to the fixing section 91. The fixing section 91 is mounted on the front surface 622, so that the press member 80 is located between the restricting member 90 and the locking member 50, and the press section 81 of the press member 80 leans against the restricting section 92.

In this embodiment, the restricting member 90 is an elongated member, and there are two fixing sections 91, so that the restricting section 92 is located between the two fixing sections 91, and the two fixing sections 91 are fixed on the two blocks 62, respectively.

Preferably, the quick-release structure for a grease gun in accordance with the invention further includes two screws A for fixing the two fixing sections 91 to the two blocks 62. Meanwhile, the two screws A also fix the base 60 to the slot 42 of the grease gun 40.

What mentioned above are the structural relations of the invention, and the operation of the invention is explained as follows in conjunction with FIGS. 4-6.

Figure 4:
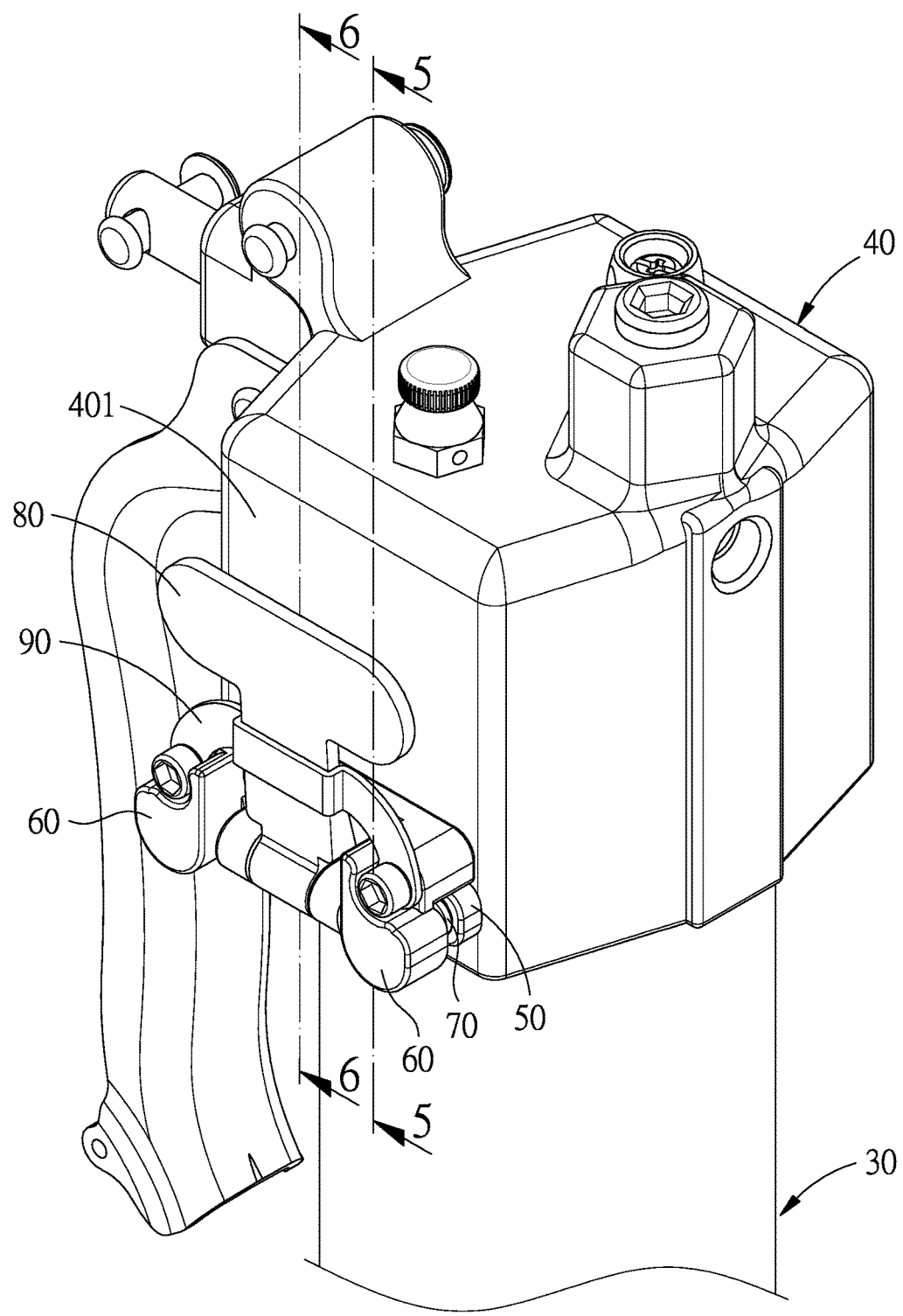
FIG. 4 is a magnified view of a part of the quick-release structure for a grease gun in accordance with the preferred embodiment of the invention.
Figure 5:
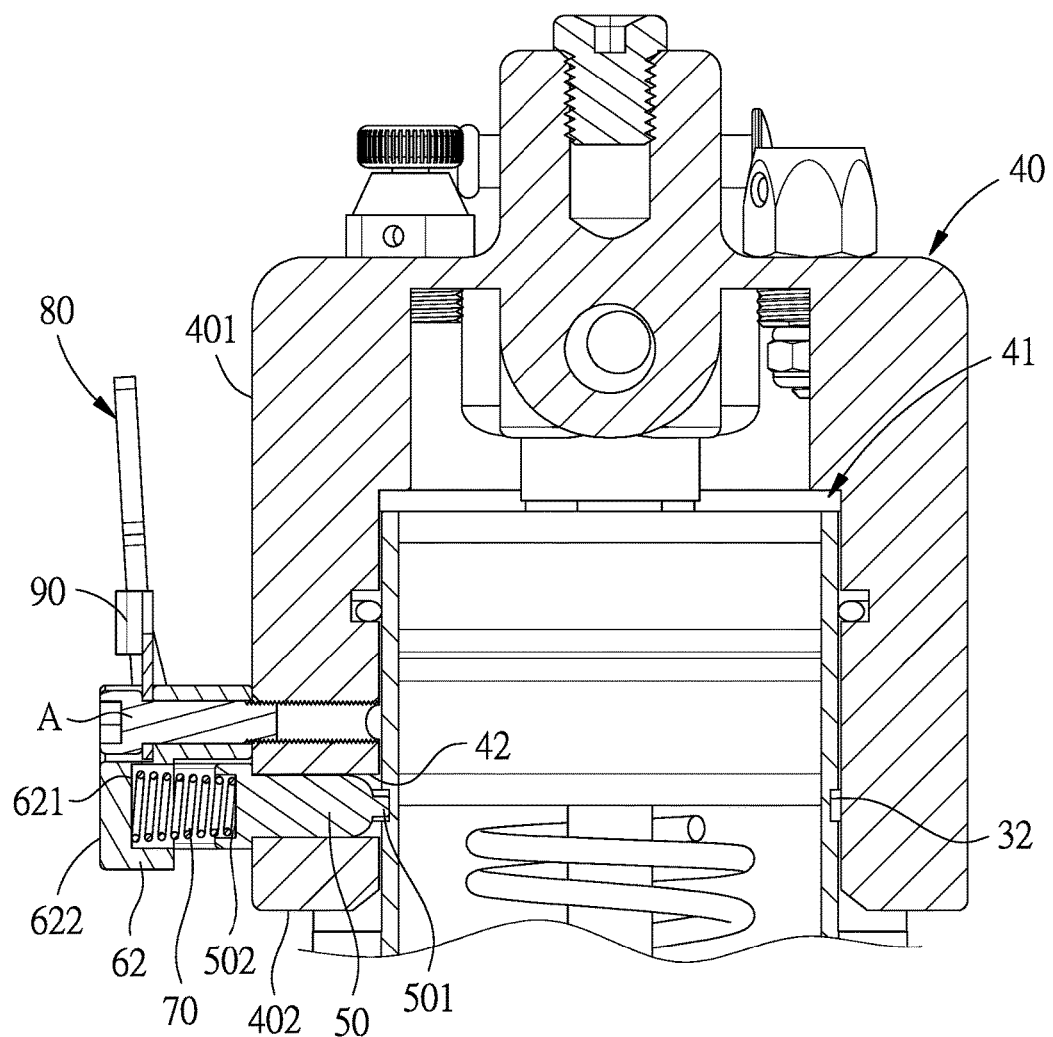
FIG. 5 is a cross sectional view taken along the line 5-5 of FIG. 4.

Referring first to FIGS. 4 and 5, under normal conditions, the two elastic members 70 are pressed between the second end surfaces 502 and the abutting surfaces 621, so that the locking member 50 is pushed towards the cylinder 30 and into the fixing groove 32 to prevent disengagement of the cylinder 30 from the grease gun 40.

Figure 6:
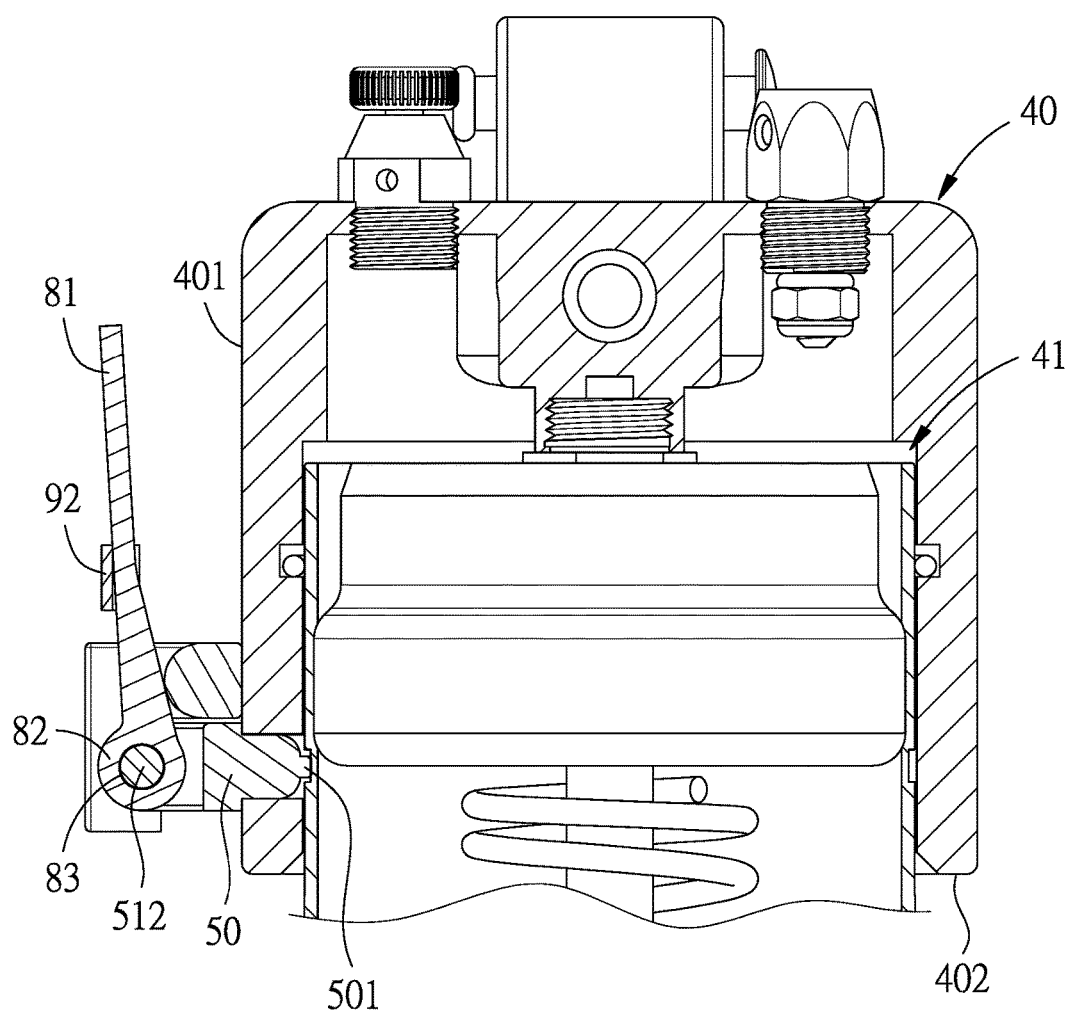
FIG. 6 is a cross sectional view taken along the line 6-6 of FIG. 4.
Figure 7:
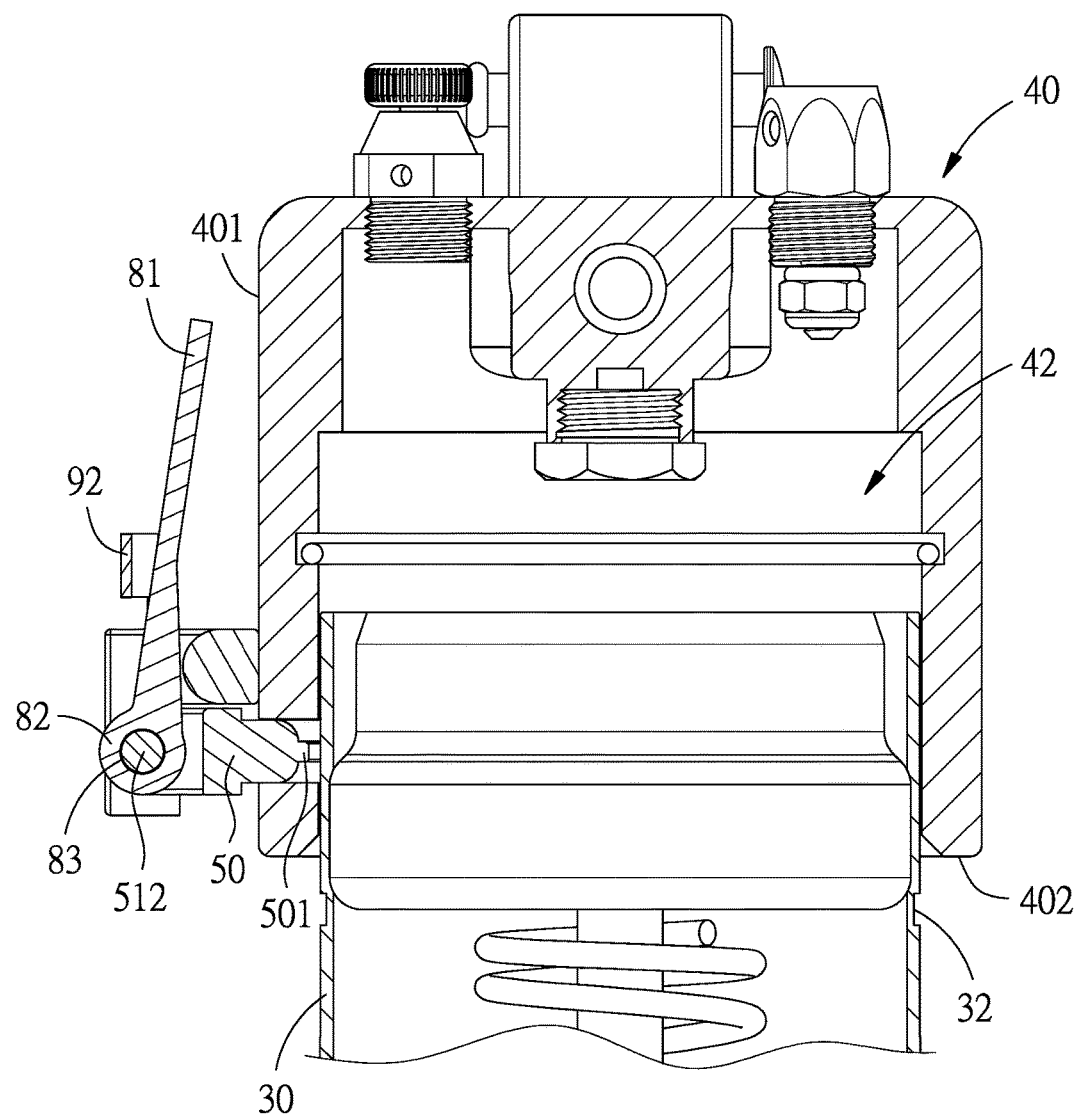
FIG. 7 is a cross sectional view of a grease gun with a quick-release structure in accordance with another preferred embodiment of the invention.

Referring then to FIG. 6, when the user pushes the press section 81 of the press member 80 to move it towards the outer surface 401 of the grease gun 40, since the press member 80 is abutted against the rib 61, the drive section 82 will be caused to move away from the grease gun 40. Meanwhile, the drive section 82 pulls the driven portion 51 of the locking member 50 towards the elastic member 70, and as a result, the locking member 50 is disengaged from the fixing groove 32, so that the cylinder 30 can be pulled out of the insertion hole 41 of the grease gun 40.

By arrangements, the quick-release structure for a grease gun in accordance with the invention allows users to quickly disassemble and assemble the cylinder 30 and the grease gun 40, thereby improving the operation efficiency and making the operation smoother.

While we have shown and described various embodiments in accordance with the present invention, it is clear to those skilled in the art that further embodiments may be made without departing from the scope of the present invention.

What is claimed is:

1. A quick-release structure for a grease gun, comprising:
   a cylinder including a peripheral wall, an insertion section on the peripheral wall, and a fixing groove formed in the insertion section;
   the grease gun including an outer surface, a bottom surface and an insertion hole formed in the bottom surface, wherein a slot is formed in the outer surface and in communication with the insertion hole, the insertion section is inserted in the insertion hole, the fixing groove is aligned to the slot;
   a locking member including a first end surface and an opposite second end surface, and being inserted in the slot until the first end surface is engaged in the fixing groove, the second end surface including a driven portion and a positioning portion;
   a base fixed to the outer surface, and including a rib and a block, the block includes an abutting surface facing toward the second end surface, and an opposite front surface, the abutting surface is located a distance away from the second end surface;

an elastic member disposed between the positioning portion of the second end surface and the abutting surface;

a press member including a press section and a drive section connected to the press section, the drive section is drivingly connected to the driven portion and to be pressed by a user; and a restricting member including a fixing section and a restricting section connected to the fixing section, the fixing section is mounted on the front surface, so that the press member is located between the restricting member and the locking member, and the press section of the press member leans against the restricting section.

2. The quick-release structure for the grease gun as claimed in claim 1, wherein the peripheral wall has a cylindrical shape, the fixing groove is an annular groove surrounding the peripheral wall, the outer surface is connected to the bottom surface, and the slot is an elongated slot extending in an extending direction of the fixing groove.

3. The quick-release structure for the grease gun as claimed in claim 1, wherein the first end surface of the locking member is arc-shaped so as to fit in the fixing groove.

4. The quick-release structure for the grease gun as claimed in claim 1, wherein there are two said positioning portions and two said blocks, the two blocks are connected to two ends of the rib, the rib is located between the two blocks, there are two said elastic members, one of the two elastic members is disposed between one of the two blocks and one of the two positioning portions, and another of the two elastic members is disposed between another of the two blocks and another of the two positioning portions.

5. The quick-release structure for the grease gun as claimed in claim 1, wherein there are two said blocks, the two blocks are connected to two ends of the rib, the rib is located between the two blocks, the restricting member is an elongated member, and there are two said fixing sections, so that the restricting section is located between the two fixing sections, and the two fixing sections are fixed on the two blocks, respectively.

6. The quick-release structure for the grease gun as claimed in claim 5, wherein two screws are used to fix the two fixing sections to the two blocks, and fix the base to the slot of the grease gun.

* * * * *